A. E. MAZE.
PROCESS FOR PRODUCING CHLORINE PRODUCTS FROM UNSATURATED HYDROCARBONS.
APPLICATION FILED AUG. 16, 1920.
1,425,669. Patented Aug. 15, 1922.
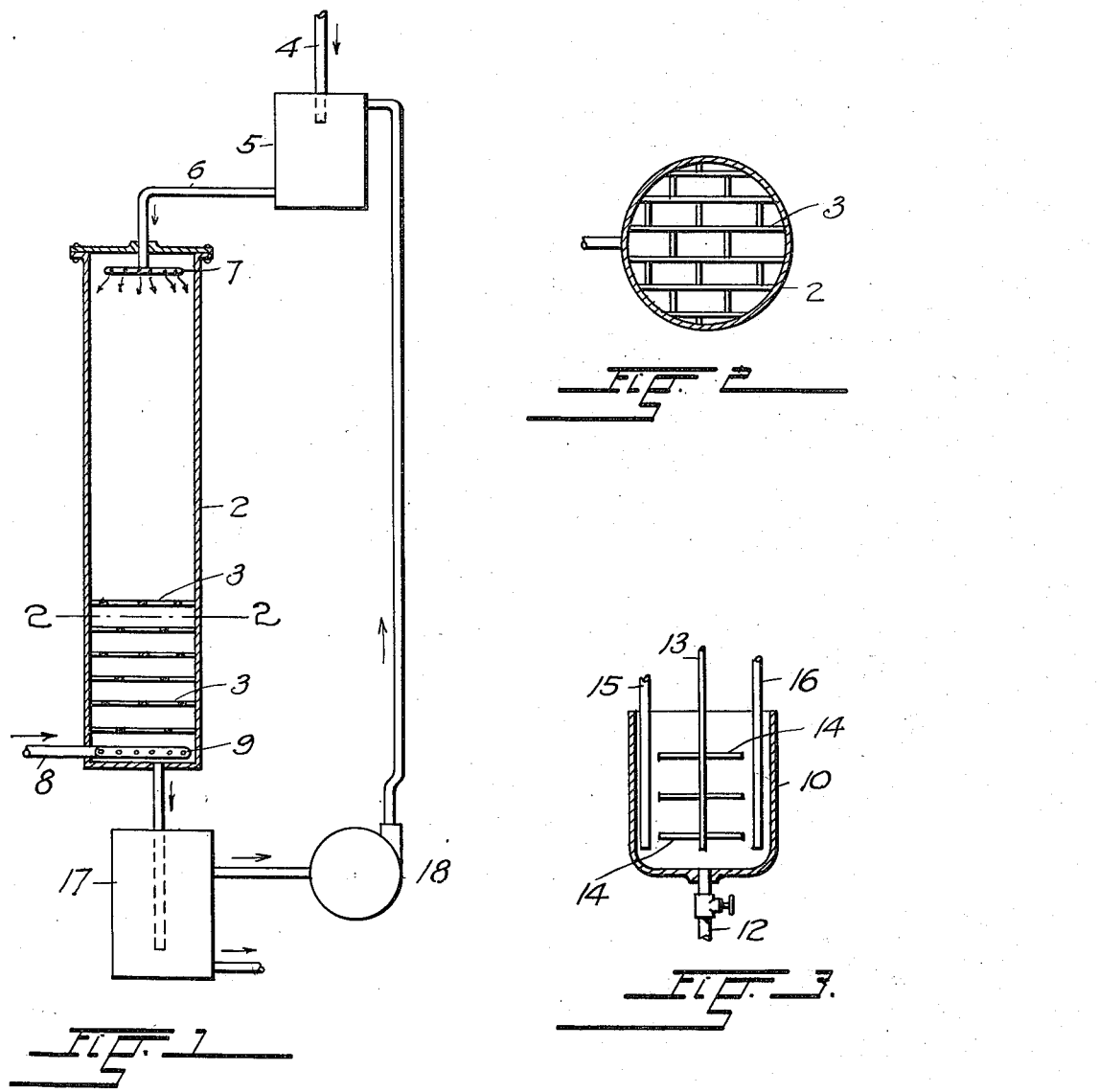
WITNESS:
INVENTOR.
A. E. MAZE
BY
ATTORNEY.

UNITED STATES PATENT OFFICE.

AUGUSTUS E. MAZE, OF DENVER, COLORADO.

PROCESS FOR PRODUCING CHLORINE PRODUCTS FROM UNSATURATED HYDROCARBONS.

1,425,669.  Specification of Letters Patent.  Patented Aug. 15, 1922.

Application filed August 16, 1920. Serial No. 403,663.

*To all whom it may concern:*

Be it known that I, AUGUSTUS E. MAZE, a citizen of the United States, residing at Denver, in the county of Denver and State of Colorado, have invented certain new and useful Improvements in Processes for Producing Chlorine Products from Unsaturated Hydrocarbons, of which the following is a specification.

This invention relates to a process of producing chlorine products from acetylene and other unsaturated hydrocarbons and its object is to provide a simple method of treating hydrocarbons with chlorine, which eliminates the possibility of the reactions reaching a condition of explosive violence.

The process consists in passing acetylene or other unsaturated hydrocarbon directly into an aqueous solution of an alkaline hydroxide or an alkaline carbonate which has previously been saturated with chlorine.

The chlorinating agent is produced by first preparing the aqueous solution of an alkaline hydroxide or carbonate and then dissolving the chlorine in the solution, preferably but not essentially, to a point of saturation.

In preparing the solution I prefer for economic reasons the use of sodium hydroxide or carbonate.

The acetylene is passed directly into the chlorinated solution by any approved method, and chlorine products—dichlorethylene ($C_2H_2Cl_2$) and tetrachlorethane ($C_2H_2Cl_4$) are produced by the following reactions.

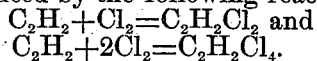

$$C_2H_2 + Cl_2 = C_2H_2Cl_2 \text{ and}$$
$$C_2H_2 + 2Cl_2 = C_2H_2Cl_4.$$

The chlorinated products are divided from the exhausted caustic solution by precipitation and are subsequently separated by distillation, and the solution is again chlorinated for repeated use in the same process.

In the accompanying drawing, I have shown two methods of carrying my process into effect.

Figure 1, showing in sectional elevation an apparatus suitable for carrying out the preferred method.

Figure 2, a transverse section thereof, taken on the line 2—2. Figure 1, and

Figure 3, a sectional elevation of an apparatus adapted for use in accomplishing the second method.

Referring first to Figures 1 and 2 of the drawings, the numeral 2 designates a tower of suitable height and diameter, closed at its ends and provided with a baffling medium of inert material to promote a thorough intermixture of the hydrocarbon with the caustic solution.

The baffling medium may consist of a mass of stones or it may be provided by latticed partitions 3 of the character shown in Figure 2, which are arranged in spaced relation to each other throughout the height of the tower.

The chlorine is introduced through a pipe 4, into the alkaline hydroxide or alkaline carbonate solution contained in a tank 5, and the solution with the contained chlorine is caused to enter the upper end of the tower through a conduit 6, which inside the tower connects with a perforated spraying head 7. The acetylene or other hydrocarbon is at the same time introduced under pressure into the tower at the bottom thereof, through a pipe 8, which inside the tower connects with a perforated coil 9, and the two opposing currents retained by the baffling media cause a thorough intermixture of the two substances, thereby causing the reactions stated hereinabove.

The exhausted caustic solution together with the chlorinated products pass out at the bottom of the tower into a settling vessel 17 in which the products settle out of the liquid which by means of a pump 18 is returned to the chlorination vat for re-use in the same process.

The apparatus illustrated in Figure 3, consists of a vessel 10 having an outlet 12 in its bottom, through which the chlorinated products are discharged and containing a suitable agitating device such as the upright shaft 13, carrying radial stirring blades 14, shown in the drawing.

The chlorine enters the hydroxide solution which partially fills the vessel, through a pipe 15, and the hydrocarbon enters at the opposite side of the vessel through a conduit 16.

Having thus described my invention what I claim and desire to secure by Letters Patent is:—

1. The process of producing chlorine products from unsaturated hydrocarbons consisting in passing the hydrocarbon into an aqueous alkaline alkali-metal solution carrying chlorine.

2. The process of producing chlorine products from unsaturated hydrocarbons consisting in passing the hydrocarbon into an aqueous alkaline alkali-metal solution saturated with chlorine.

3. The process of producing chlorine products from unsaturated hydrocarbons consisting in passing the hydrocarbon into an aqueous alkaline alkali-metal solution carrying chlorine and allowing the chlorinated products to settle out of the solution after it is exhausted.

4. The process of producing chlorine products from unsaturated hydrocarbons consisting in passing the hydrocarbon into an aqueous alkaline alkali-metal solution carrying chlorine, separating the chlorinated products from the exhausted solution by precipitation, and rechlorinating the solution for reuse in the same process.

5. The process of producing chlorine products from unsaturated hydrocarbons consisting in bringing the hydrocarbon into intimate contact with an aqueous alkaline alkali-metal solution carrying chlorine, by oppositely directed currents.

6. The process of producing chlorine products from unsaturated hydrocarbons consisting in bringing the hydrocarbon into intimate contact with an aqueous alkaline alkali-metal solution carrying chlorine, by oppositely directed retarded currents.

7. The process of making chlorinated hydrocarbons comprising passing acetylene into an alkaline alkali-metal solution saturated with chlorine.

8. The process of making chlorinated hydrocarbons comprising passing acetylene into an alkali hydroxid solution saturated with chlorine, separating the chlorinated products from the exhausted solution, and re-chlorinating the latter for use in the process.

9. The process of making chlorinated hydrocarbons comprising passing acetylene into an alkaline alkali-metal solution carrying chlorine, the acetylene and saturated solution being introduced in oppositely disposed currents, and collecting the chlorinated products.

In testimony whereof I have affixed my signature.

AUGUSTUS E. MAZE.